(12) United States Patent
Yang et al.

(10) Patent No.: US 9,754,328 B2
(45) Date of Patent: Sep. 5, 2017

(54) SOCIAL ACTIVITY PLANNING SYSTEM AND METHOD

(71) Applicant: ACADEMIA SINICA, Taipei (TW)

(72) Inventors: De-Nian Yang, Taipei (TW); Chih-Ya Shen, New Taipei (TW); Hong-Han Shuai, New Taipei (TW); Ming-Syan Chen, Taipei (TW)

(73) Assignee: ACADEMIA SINICA, Taipei (TW)

( * ) Notice: Subject to any disclaimer, the term of this patent is extended or adjusted under 35 U.S.C. 154(b) by 459 days.

(21) Appl. No.: 14/455,384

(22) Filed: Aug. 8, 2014

(65) Prior Publication Data
US 2015/0046473 A1 Feb. 12, 2015

Related U.S. Application Data

(60) Provisional application No. 61/863,443, filed on Aug. 8, 2013.

(51) Int. Cl.
*G06F 17/30* (2006.01)
*G06Q 50/00* (2012.01)
*G06Q 10/10* (2012.01)

(52) U.S. Cl.
CPC .......... *G06Q 50/01* (2013.01); *G06Q 10/109* (2013.01)

(58) Field of Classification Search
USPC ................. 707/737–738, 748, 751
See application file for complete search history.

(56) References Cited

U.S. PATENT DOCUMENTS

| | | | | |
|---|---|---|---|---|
| 9,026,601 | B1 * | 5/2015 | Gauvin | G06Q 50/01 709/206 |
| 9,253,615 | B2 * | 2/2016 | Ickman | G06Q 10/1095 |
| 9,432,502 | B2 * | 8/2016 | Papakipos | H04L 51/046 |
| 2007/0218900 | A1 * | 9/2007 | Abhyanker | G06Q 10/087 455/435.1 |
| 2012/0290565 | A1 * | 11/2012 | Wana | G06F 17/3089 707/723 |
| 2012/0290950 | A1 * | 11/2012 | Rapaport | H04L 51/32 715/753 |

(Continued)

OTHER PUBLICATIONS

Yunjun Gao et al., "Continuous Obstructed Nearest Neighbor Queries in Spatial Databases", Proceedings of the 2009 ACM SIGMOD International Conference on Management of Data, Jun. 29, 2009, pp. 577-589.

(Continued)

*Primary Examiner* — Hanh Thai
(74) *Attorney, Agent, or Firm* — Sughrue Mion, PLLC

(57) ABSTRACT

A social activity planning method includes the following operation. A database storing multiple candidate invitees with their geographical locations and interest scores towards a topic, and a social graph including vertices representing the candidate invitees and edges connecting two vertices representing mutual acquaintance of the associated candidate invitees is accessed. A social activity request including an invitation number, information about a social activity, and a familiarity condition for the social activity request is received. At least one feasible solution including the invitation number of the candidate invitees and meeting the familiarity condition is generated. A group of selected invitees are found based on the feasible solution and the information about the social activity.

22 Claims, 11 Drawing Sheets

(56) References Cited

U.S. PATENT DOCUMENTS

| | | | | |
|---|---|---|---|---|
| 2013/0013683 | A1* | 1/2013 | Elliott | G06Q 10/101 |
| | | | | 709/204 |
| 2013/0066963 | A1* | 3/2013 | Odio | G06Q 10/10 |
| | | | | 709/204 |
| 2013/0137078 | A1* | 5/2013 | Shustorovich | G09B 7/00 |
| | | | | 434/362 |
| 2014/0012926 | A1* | 1/2014 | Narayanan | G06Q 50/01 |
| | | | | 709/206 |
| 2014/0358897 | A1* | 12/2014 | Mishra | G06F 17/30867 |
| | | | | 707/722 |
| 2015/0019523 | A1* | 1/2015 | Lior | G06Q 10/109 |
| | | | | 707/708 |
| 2015/0170045 | A1* | 6/2015 | Kirkham | G06Q 10/06 |
| | | | | 706/11 |

OTHER PUBLICATIONS

Dimitris Papadias et al., "Group Nearest Neighbor Queries", Proceedings of the 20th International Conference on Data Engineering, Mar. 30, 2004 pp. 301-312.

Ke Deng et al., "On Group Nearest Group Query Processing", IEEE Transactions on Knowledge and Data Engineering, Feb. 2012, pp. 295-308, vol. 24, No. 2.

Feifei Li et al., "Group Enclosing Queries", IEEE Transactions on Knowledge and Data Engineering, Oct. 2011, pp. 1526-1540, vol. 23, No. 10.

Mauro Sozio et al., "The Community-Search Problem and How to Plan a Successful Cocktail Party", Proceedings of the 16th ACM SIGKDD International Conference on Knowledge Discovery and Data Mining, Jul. 25, 2010, pp. 939-948.

Amita Gajewar et al., "Multi-skill Collaborative Teams based on Densest Subgraphs", Proceedings of the 2012 SIAM International Conference on Data Mining, Apr. 26, 2012, pp. 165-176.

Weimo Liu et al., "Circle of Friend Query in Geo-Social Networks", Proceedings of 17th International Conference on Database Systems for Advanced Applications (DASFAA), Apr. 15, 2012, pp. 126-137.

Nikos Armenatzoglou et al., "A General Framework for Geo-Social Query Processing", Proceedings of the VLDB Endowment, Aug. 26, 2013, pp. 913-924, vol. 6, No. 10.

Alan Mislove et al., "You Are Who You Know: Inferring User Profiles in Online Social Networks", Proceedings of the third ACM International Conference on Web Search and Data Mining, Feb. 4, 2010, pp. 251-260.

Shuang Hong Yang et al., "Like like alike: Joint Friendship and Interest Propagation in Social Networks", Proceedings of the 20th International Conference on World Wide Web, Mar. 28, 2011, pp. 537-546.

Christo Wilson et al., "User Interactions in Social Networks and Their Implications", Proceedings of the 4th ACM European Conference on Computer Systems, Apr. 1, 2009, pp. 205-218.

Eric Gilbert et al., "Predicting Tie Strength with Social Media", Proceedings of the SIGCHI Conference on Human Factors in Computing Systems, Apr. 6, 2009, pp. 211-220.

Haifeng Yu et al., "Sybilguard: Defending Against Sybil Attacks via Social Networks", Proceedings of the 2006 Conference on Applications, Technologies, Architectures, and Protocols for Computer Communications, Sep. 11, 2006, pp. 267-278.

De-Nian Yang et al., "On Bundle Configuration for Viral Marketing in Social Networks", Proceedings of the 21st ACM International Conference on Information and Knowledge Management, Oct. 29, 2012, pp. 2234-2238.

Mao Ye et al., "Exploring Social Influence for Recommendation—a Generative Model Approach" Proceedings of the 35th International ACM SIGIR Conference on Research and Development in Information Retrieval, Aug. 12, 2012, pp. 671-680.

Cheng-Te Li et al., "Team Formation for Generalized Tasks in Expertise Social Networks", Proceedings of IEEE Second International Conference on Social Computing/ IEEE International Conference on Privacy, Security, Risk and Trust, Aug. 20, 2010, pp. 9-16.

Mehdi Kargar et al., "Discovering Top-k Teams of Experts with/ without a Leader in Social Networks" Proceedings of the 20th ACM International Conference on Information and Knowledge Management, Oct. 24, 2011, pp. 985-994.

De-Nian Yang et al., "On Socio-Spatial Group Query for Location-Based Social Networks", Proceedings of the 18th ACM SIGKDD International Conference on Knowledge Discovery and Data Mining, Aug. 12, 2012, pp. 949-957.

Hong-Han Shuai et al., "Willingness Optimization for Social Group Activity", Proceedings of the 2014 International Conference on Very Large Data Bases, Sep. 1, 2014, pp. 1-16.

* cited by examiner

US 9,754,328 B2

SOCIAL ACTIVITY PLANNING SYSTEM AND METHOD

RELATED APPLICATIONS

This application claims priority to Provisional Patent Application Ser. No. 61/863,443, filed Aug. 8, 2013, which is herein incorporated by reference.

BACKGROUND

Field of Invention

The present disclosure relates to a social activity planning system and method. More particularly, the present disclosure relates to a social activity planning system and method maximizing the willingness or possibility of the attendees to join the social activity.

Description of Related Art

A social networking service is a platform to build social networks or social relations among people who share interests, activities, backgrounds or real-life connections. Each user of a social network service establishes a profile including basic information such as living place, educational background, and interests such as favorite TV shows or books.

Most social network services are web-based and provide means for users to interact over the Internet. With the advance of communication technology, network-enabled devices, e.g., mobile phones and tablets, are increasingly affordable. As a result, social networking has become one of the most popular ways to meet people and make friends.

Another recent feature of the social networking websites is location awareness. Users can share where they are by manually selecting places or using positioning results of GPS-enabled devices. This has allowed users to check if their friends are nearby. Many shops and stores, particularly restaurants, increase their business exposure by providing discounts to those customers who check-in to the shop on social networking websites.

Humans are naturally social beings. Cyber social networks have greatly changed the social life landscape, but real-life interactions remain indispensable. Social networking websites can serve as a convenient communication mean for invitation when organizing a real-life activity. The organizer selects from a pool of candidate invitees who might be interested in the activity itself or close to the location of the activity, and sends out invitations just by clicking and typing on the social networking websites. However, the manual selection is still a tedious job when the size of the pool is large.

SUMMARY

An aspect of the present disclosure is directed to a social activity planning system. The social activity planning system includes a database storing multiple candidate invitees with their geographical locations and interest scores towards a topic, and a social graph ($G=\{V,E\}$) including vertices ($v_i \in V$) representing the candidate invitees, and edges ($e_{i,j} \in E$) connecting vertex ($v_i$) and vertex ($v_j$) representing mutual acquaintance of the associated candidate invitees. The social activity planning system also includes a social activity planning device with a processing unit and an input unit, connected to the database. The input unit receives a social activity request including an invitation number (p), information about a social activity, and a familiarity condition for the social activity request. The processing unit generates at least one feasible solution including (p) candidate invitees meeting the familiarity condition. The processing unit also finds a group of selected invitees based on the feasible solution and the information about the social activity.

Another aspect of the present disclosure is directed to a social activity planning method including the following operation. A database storing multiple candidate invitees with their geographical locations and interest scores towards a topic, and a social graph ($G=\{V,E\}$) including vertices ($v_i \in V$) representing the candidate invitees and edges ($e_{i,j} \in E$) connecting vertex ($v_i$) and vertex ($v_j$) representing mutual acquaintance of the associated candidate invitees represented is accessed. A social activity request including an invitation number (p), information about a social activity, and a familiarity condition for the social activity request is received. At least one feasible solution including (p) candidate invitees and meeting the familiarity condition is generated. A group of selected invitees is found based on the feasible solution and the information about the social activity.

The social activity planning method and system in the disclosure is integrable with existed social networking websites and simplifies the tedious process of manually selecting invitees of a social activity. It also provides parameters for flexibility of activity organization while improving the quality and atmosphere of the social activity.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
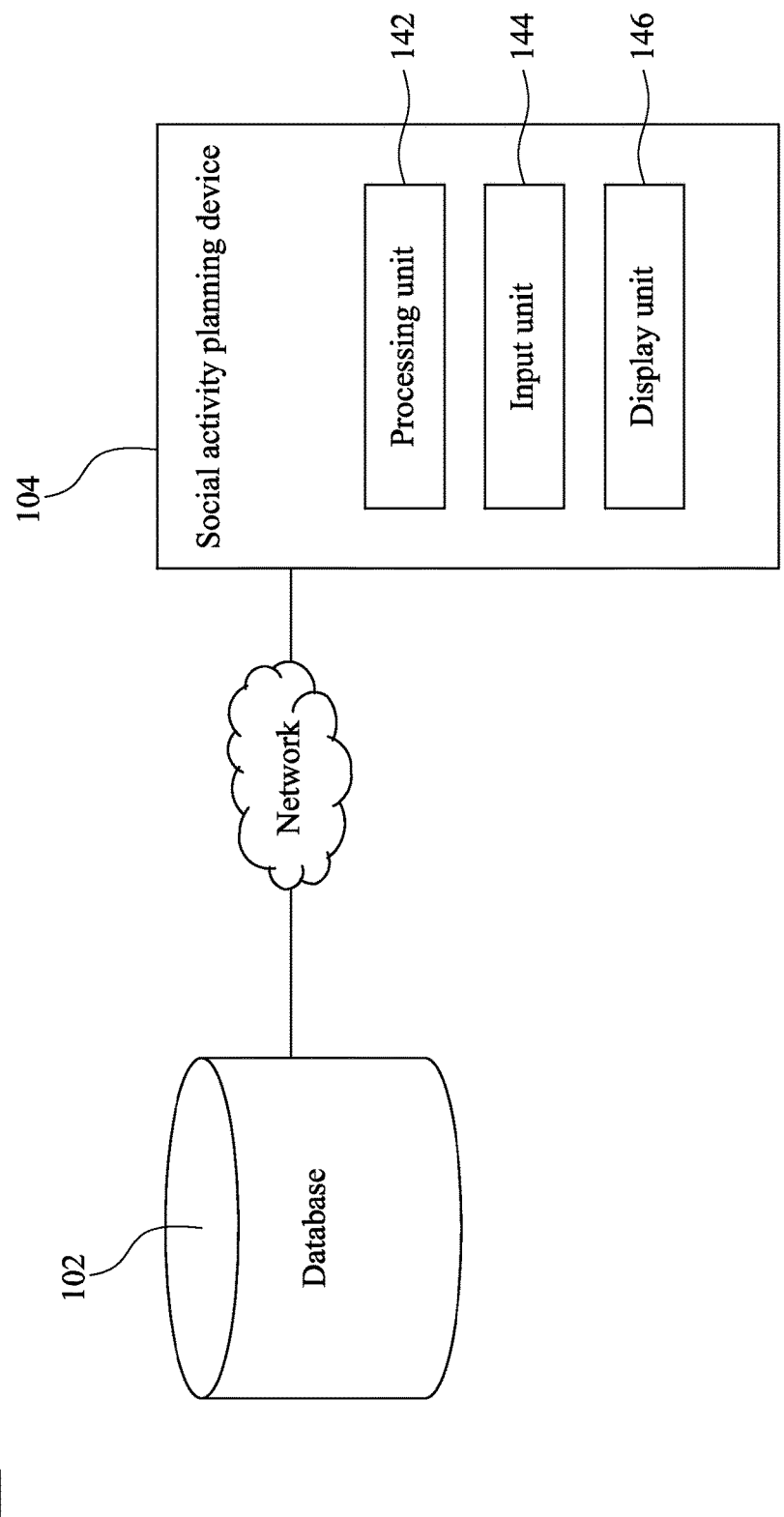
FIG. 1 is a schematic diagram according to a first embodiment of the social activity planning system of the disclosure.

Reference will now be made in detail to the present embodiments of the disclosure, examples of which are illustrated in the accompanying drawings. Wherever possible, the same reference numbers are used in the drawings and the description to refer to the same or like parts.

As used in the description herein and throughout the claims that follow, the meaning of "a", "an", "one" and "the" includes plural reference unless the context clearly dictates otherwise.

FIG. 1 is a schematic diagram according to a first embodiment of the social activity planning system. The social activity planning system 100 includes a database 102 and a social activity planning device 104. The database 102 stores a social graph of multiple candidate invitees and their geographical locations and interest scores toward a topic. The social graph is denoted as ($G=\{V,E\}$), with vertices ($v_i \in V$) representing the candidate invitees, and edges ($e_{i,j} \in E$) connecting vertex ($v_i$) and vertex ($v_j$) representing mutual acquaintance of the candidate invitees represented by the vertex ($v_i$) and the vertex ($v_j$). The social activity planning device 104 is a personal computer, a server, or any hardware that has computing resources.

The social activity planning device 104 includes a processing unit 142 (e.g., CPU or micro processing unit), an input unit 144 (e.g., mouse or keyboard), and a display unit 146 (e.g. LCD display or OLED display). The social activity planning device 104 accesses the database 102 through a network connection or the database is locally stored in a non-transitory computer readable storage medium in the social activity planning device 104. The non-transitory computer readable storage medium is a hard disk, an optical disk, or a flash memory. The input unit 144 receives a location social activity request including an invitation number (p), information about a social activity, and a familiarity condition for the social activity request.

The invitation number (p) is the number of people who are invited to the activity, and depends on size of venues, such as a tiny café shop or an exhibition hall, and styles of an activity, such as a tough mountain hiking or a bonfire party. The information about the social activity includes the venue, the time, or the style of the social activity. However, not all information about an activity matters to the same degree. For an impromptu activity, the time is inherently now, so location matters more. For a cultural activity, whether one takes interest in the topic of the activity is important. The familiarity condition specifies how many people totally unknown to each other are invited or how close the (p) invitees selected are. Researches in psychology have shown that people are more willing to join an activity if friends attend as well. The atmosphere of a social activity is also affected by how many new friends are present. If one does not know anyone in a social gathering, he/she usually feels awkward, and thus cannot enjoy himself/herself. As a result, familiarity condition is important in a social activity request.

After the social activity request is received, the social activity planning system 100 generates at least one feasible solution, and the feasible solution includes (p) candidate invitees in the database 102 and meets the familiarity condition. The social activity planning system 100 further finds a group of selected invitees to maximize the willingness of the selected invitees to attend based on the feasible solution and the information about the social activity. In one embodiment, the group of the selected invitees are displayed by the display unit 146 for confirmation or further manual editing.

Figure 2:
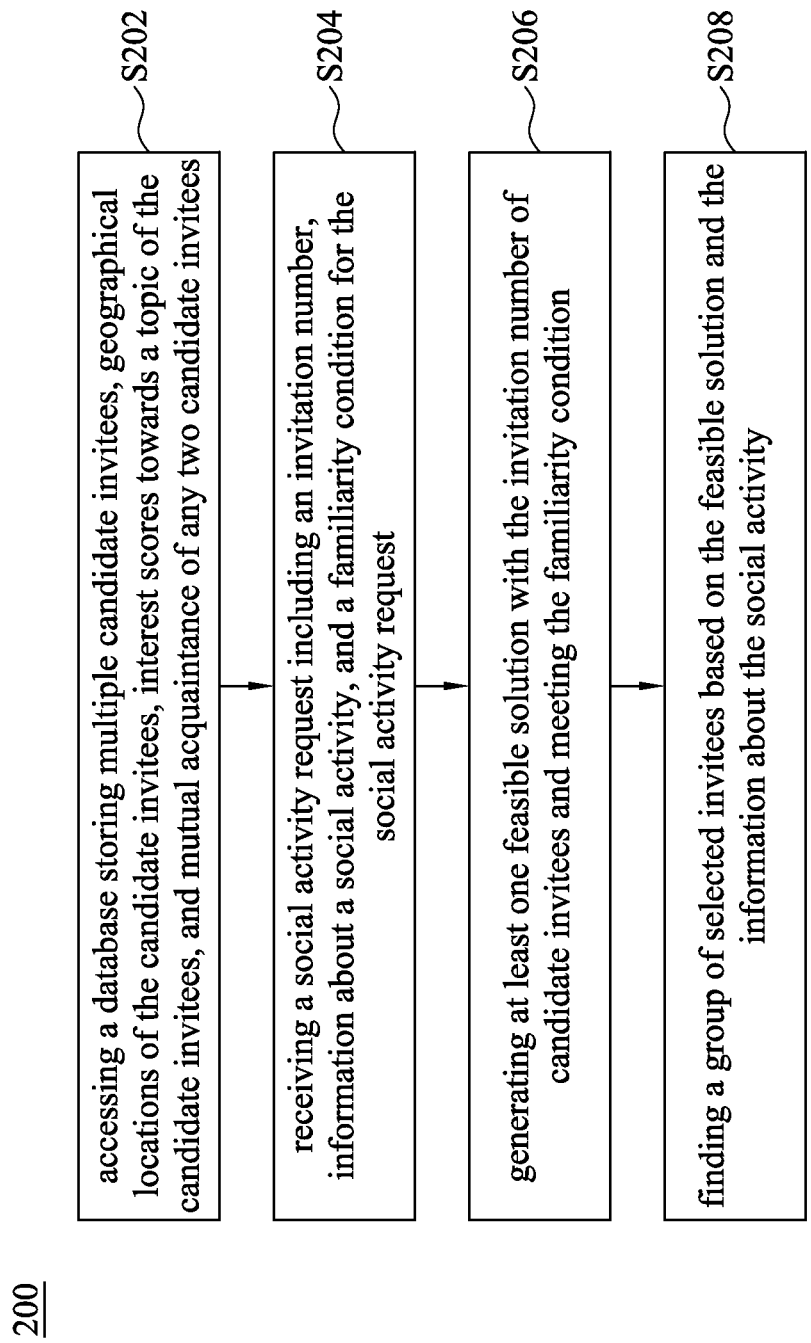
FIG. 2 is a flow chart according to a second embodiment of the social activity planning method of the disclosure.

FIG. 2 is a flow chart according to a second embodiment of the social activity planning method of the disclosure. The social activity planning method 200 includes the following operation. Operation S202 is accessing a database storing multiple candidate invitees, geographical locations of the candidate invitees, interest scores towards a topic of the candidate invitees, and mutual acquaintance between any two candidate invitees. The database also stores a social graph ($G=\{V,E\}$), with vertices ($v_i \in V$) representing the candidate invitees, and edges ($e_{i,j} \in E$) connecting vertex ($v_i$) and vertex ($v_j$) representing mutual acquaintance of the candidate invitees represented by the vertex ($v_i$) and the vertex ($v_j$).

Operation S204 is receiving a social activity request including an invitation number (p), information about a social activity, and a familiarity condition for the social activity request.

Operation S206 is generating at least one feasible solution, where the feasible solution includes (p) candidate invitees and meets the familiarity condition specified in the social activity request. The feasible solution obtained in this step satisfies all hard constraints, and generates a list of candidate invitees in response to the social activity request automatically to save the trouble of tedious manual selection.

Operation S208 is finding a group of selected invitees based on the feasible solution obtained in the previous step and the information about the social activity. In contrast with the feasible solution, the group of selected invitees is obtained to maximize the possibility of the invitees attending the social activity.

The present disclosure includes two different types of social activity requests. The first type is related to organizing an impromptu social activity. With the success of social networking and the explosive growth of smartphone users, organizing impromptu social activities anywhere and anytime becomes feasible. Challenges faced in organizing impromptu activities are the requirements of making timely invitations in accordance with the potential activity locations, the locations of candidate attendees and the social relations among them. This type of social activity request is termed as a Socio-Spatial Group Query (SSGQ), aiming to find a set of most suitable candidate invitees for a planned activity by taking into account certain spatial and social constraints.

Figure 3:
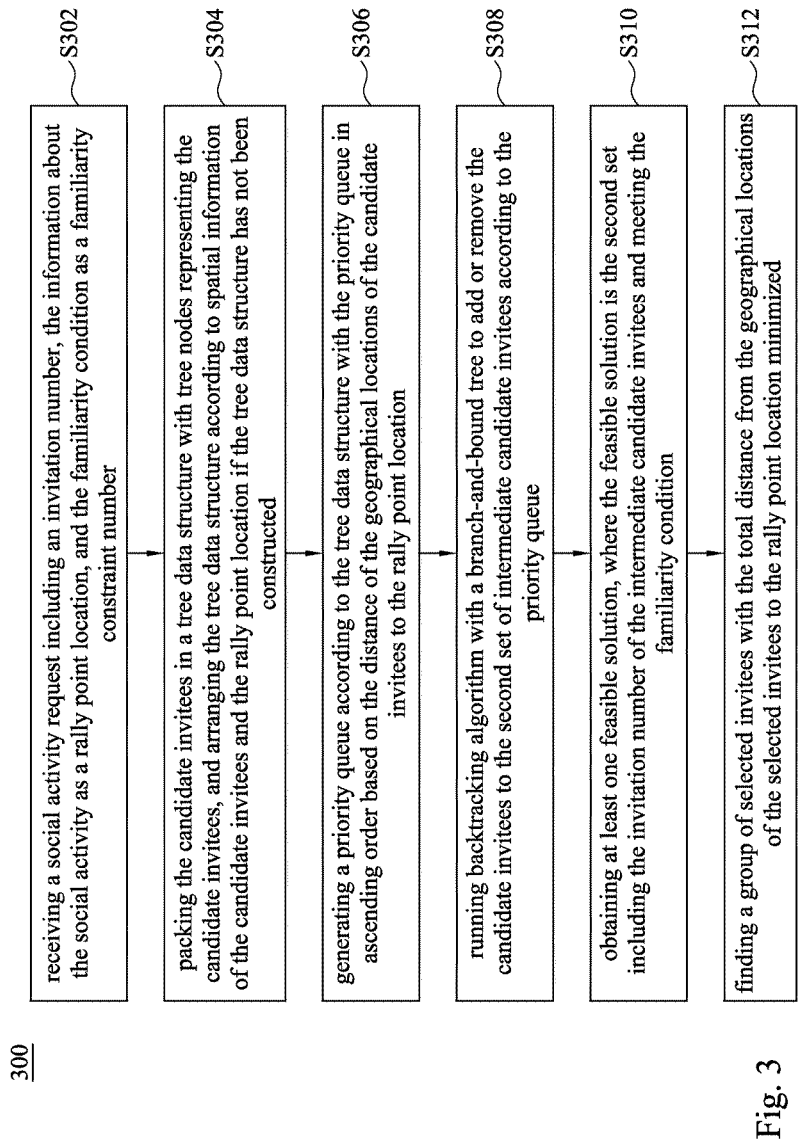
FIG. 3 is a flow chart according to a third embodiment of the social activity planning method of the disclosure.
Figure 4:
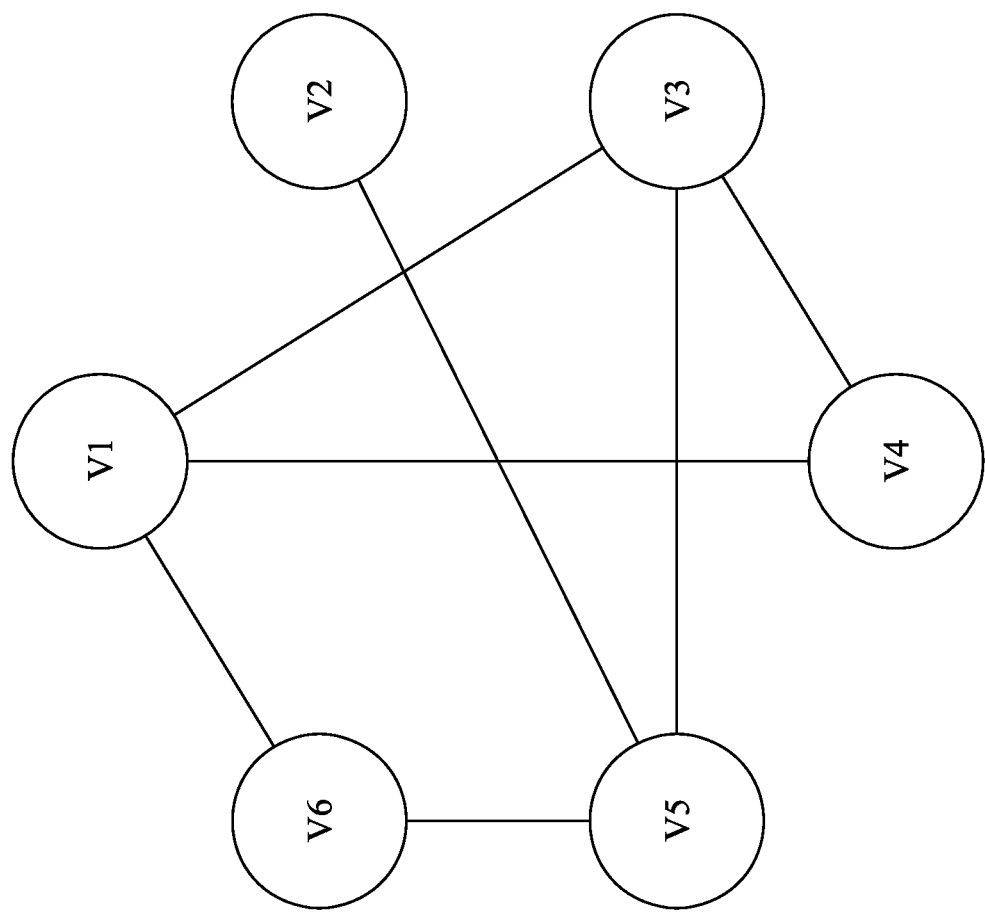
FIG. 4 is a schematic diagram of a social graph according to the third embodiment of the social activity planning method of the disclosure.

FIG. 3 is a flow chart according to a third embodiment of the social activity planning method of the disclosure. The social activity planning method 300 includes operations similar to the social activity planning method 200. The database in the third embodiment stores six candidate invitees, and the social graph of the candidate invitees is illustrated in FIG. 4. The figures are simplified for explanation, and should not be used to limit the scope of the disclosure.

The social activity planning method 300 stems from the social activity planning method 200, and is used particularly for solving the first type of social activity request, SSGQ, in the previous paragraph. Before operation S302 is performed, a database storing multiple candidate invitees, geographical locations of the candidate invitees, interest scores towards a topic of the candidate invitees, and mutual acquaintance of any two candidate invitees is accessed.

Operation S302 is receiving a social activity request including an invitation number (p), the information about the social activity as a rally point location (q), and the familiarity condition as a familiarity constraint number (k), which means (p) candidate invitees are invited to attend the social activity held at the rally point location (q), and the average number of unknown invitees for the (p) candidate invitees is no greater than the familiarity constraint number (k). Therefore, to efficiently process this request, various strategies are designed, including Distance Ordering, Socio-Spatial Ordering, Distance Pruning, and Familiarity Pruning, to effectively find an optimal solution while reducing the processing time.

Distance Ordering examines the candidate invitees closer to the rally point location (q) first and then the farther one. The first step of Distance Ordering is organizing the candidate invitees with spatial information. Operation S304 is packing the candidate invitees in a tree data structure with tree nodes representing the candidate invitees, and arranging the tree data structure according to spatial information of the candidate invitees and the rally point location (q), if the R-tree data structure has not been constructed. In one embodiment, the candidate invitees are packed into the R-tree data structure before receiving the social activity request since the R-tree data structure is independent from the rally point location (q) and only needs to be constructed once.

In operation S306, the tree data structure is used to generate a priority queue according to the tree data structure with the priority queue in ascending order based on the distance of the geographical locations of the candidate invitees to the rally point location (q).

In one embodiment, the tree data structure is an R-tree data structure, and the priority queue is a part of the distance browsing algorithm. The R-tree data structure can be generated before receiving the social activity request because it only concerns the spatial relationship among the candidate invitees. Therefore, it enables the algorithm to know which candidate invitee is nearer to the rally point location (q) without sorting all candidate invitees according to distance every time when new social activity requests with different rally locations (q) are received.

A first set $(S_R)$ includes all candidate invitees in the database. In operation S308, backtracking algorithm is run with a branch-and-bound tree to add or remove the candidate invitees from the first set $(S_R)$ to a second set $(S_I)$ according to an order of the priority queue. The candidate invitees added to the second set $(S_I)$ are termed as intermediate candidate invitees. The branch-and-bound tree is a tree with its nodes representing the second set $(S_I)$ including different intermediate candidate invitees, and the branch-and-bound tree is expanded to explore different combinations in the second set $(S_I)$ to find a solution for SSGQ.

Figure 5:
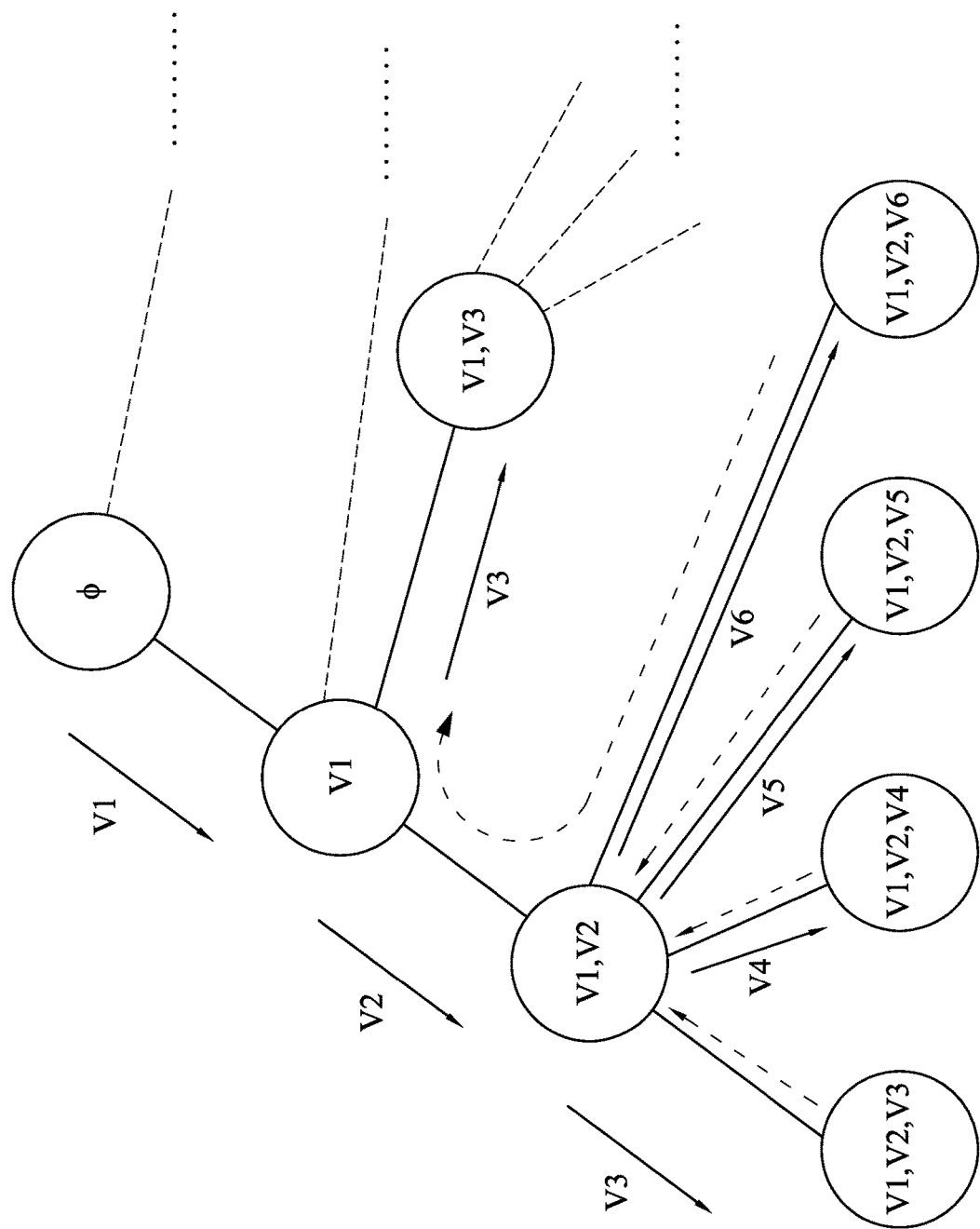
FIG. 5 is a schematic diagram of a branch-and-bound tree according to the third embodiment of the social activity planning method of the disclosure.
Figure 6:
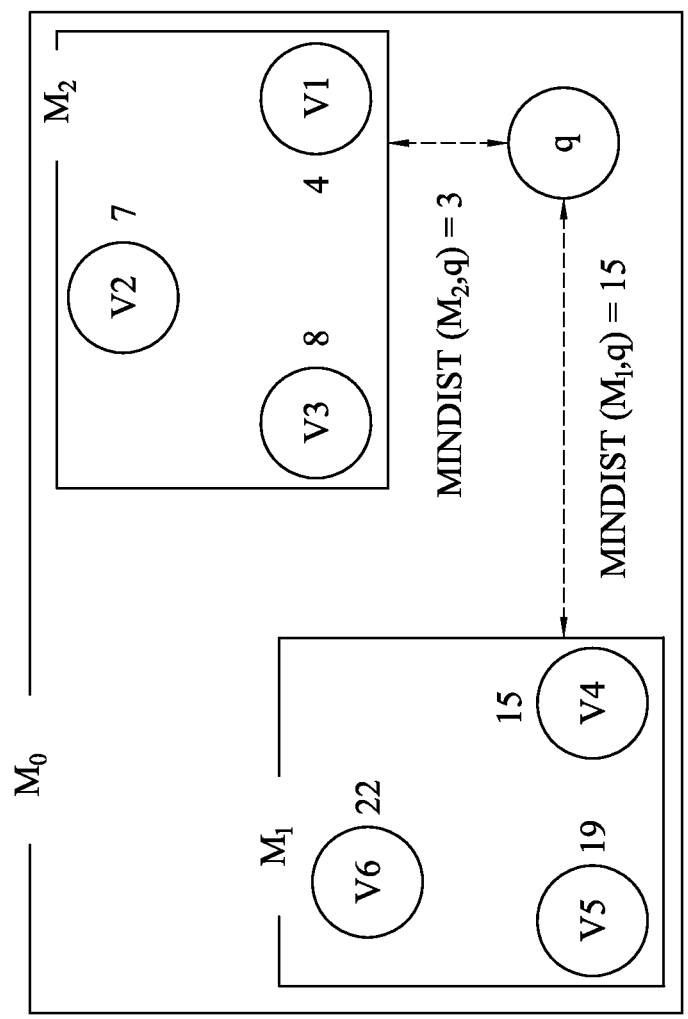
FIG. 6 is a schematic diagram of an R-tree according to the third embodiment of the social activity planning method of the disclosure.

FIG. 5 is a schematic diagram of the branch-and-bound tree, and FIG. 6 is a schematic diagram of an R-tree. Both figures are illustrated according to the third embodiment of the social activity planning method of the disclosure. From FIG. 6, the minimum bounding rectangle (MBR) $(M_2)$ is closer to the rally point location (q). As a result, the priority queue generated from the R-tree indicates searching $(M_2)$ first. In $(M_2)$, $(v_1)$ is closer then $(v_2)$, and then $(v_3)$. Therefore, the branch-and-bound tree is expanded by adding the candidate invitee incrementally according to the order of the priority queue. Once a new node is expanded, the algorithm checks if the second set $(S_I)$ meets the familiarity condition specified by the familiarity constraint number (k). FIG. 5 shows the process with arrows indicating the direction of expansion by Distance Ordering.

Two factors are considered to find a solution for SSGQ, which are distance and familiarity. The candidate invitees closer to the rally point location (q) are favorable because they are more likely to attend the social activity for proximity. With distance being considered in the operation S310, familiarity is not utilized in the process of finding a solution for SSGQ. When aiming to find a feasible solution including (p) candidate invitees and meeting the familiarity constraint for a SSGQ efficiently, familiarity is considered during the expansion of the branch-and-bound tree by adding the candidate invitees with better connectivity to the second set $(S_I)$, which means adding the candidate invitee who knows more intermediate candidate invitees in the second set $(S_I)$. This strategy builds on the R-tree used in Distance Ordering too, so the strategy is termed as Socio-Spatial Ordering. To apply Socio-Spatial Ordering, an intra-familiarity $(F(S_I \cup \{v\}))$ of a candidate invitee (v) in the first set $(S_R)$ to the second set $(S_I)$ is defined as:

$$F(S_I \cup \{v\}) = \frac{1}{|S_I \cup \{v\}|} \sum_{v \in S_I \cup \{v\}} |N_v|,$$

where $(N_v)$ is the set of the intermediate invitees in $(S_I \cup \{v\})$ connected to (v).

With the intra-familiarity for the candidate invitees in the first set $(S_R)$ defined, the intra-familiarity condition is defined as:

$$F(S_I \cup \{v\}) \geq |S_I \cup \{v\}| - \frac{\hat{k}(|S_I \cup \{v\}|)}{p-1} - 1,$$

where $(\hat{k})$ is a filtering parameter. The candidate invitee in the first set $(S_R)$ is added to the second set $(S_I)$ if it meets the intra-familiarity condition.

Figure 7:
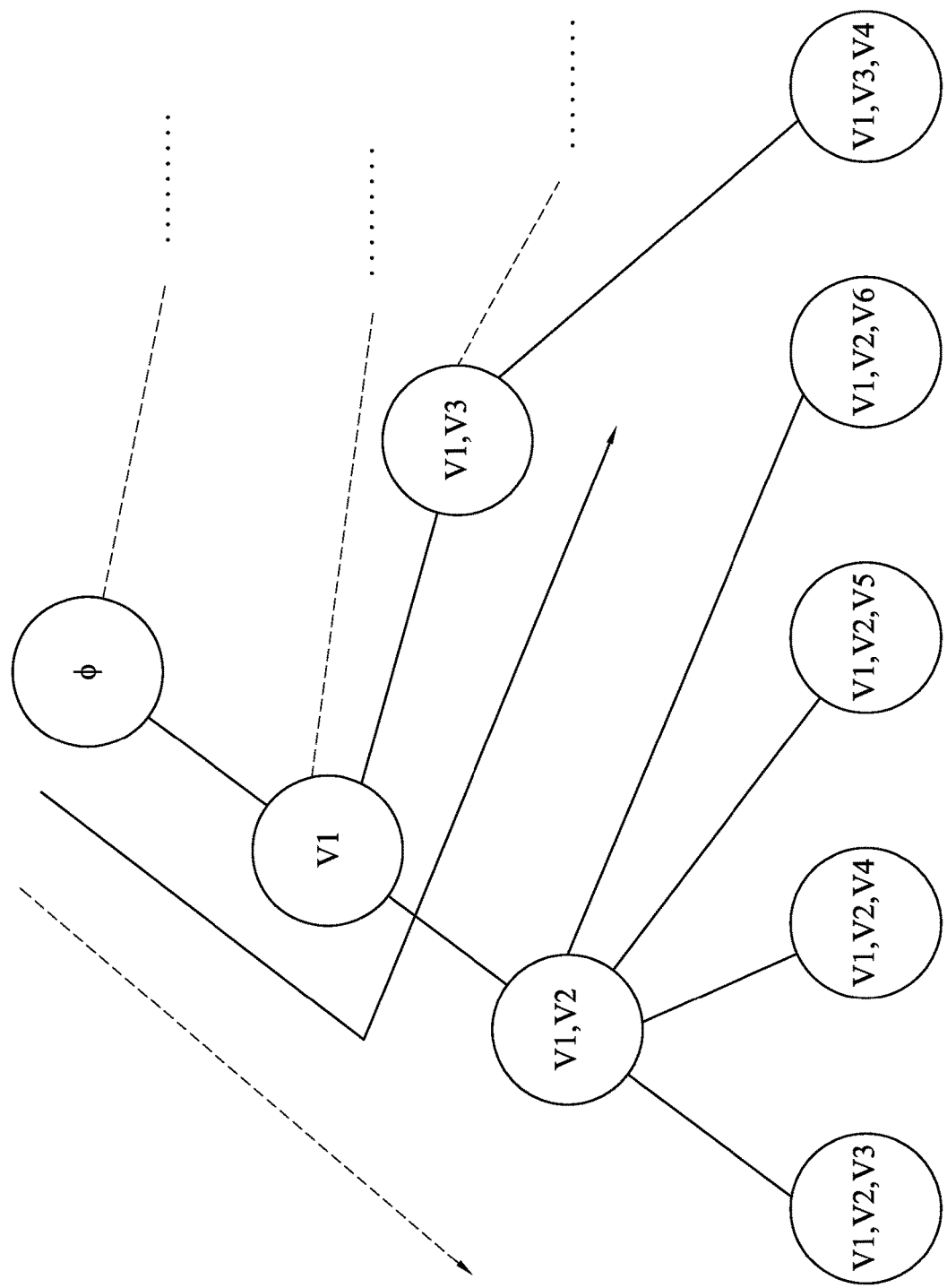
FIG. 7 is another schematic diagram of the branch-and-bound tree according to the third embodiment of the social activity planning method of the disclosure.

At first, the filtering parameter $(\hat{k})$ is set as the familiarity constraint number (k) and increased if no candidate invitees in the first set $(S_R)$ can satisfy the intra-familiarity condition. The filtering parameter $(\hat{k})$ is increased until at least one candidate invitees in the first set $(S_R)$ follows the intra-familiarity condition. By modifying the filtering parameter $(\hat{k})$, the algorithm expands the branch-and-bound tree more efficiently by incorporating the familiarity. FIG. 7 is another schematic diagram of the branch-and-bound tree according to the third embodiment of the social activity planning method of the disclosure, and the solid line indicates how Socio-Spatial Ordering leads to examining better connected candidate invitees first compared to the dashed line indicating examining with Distance Ordering.

Operation S310 is obtaining at least one feasible solution, where the feasible solution is the second set $(S_I)$ including the invitation number (p) of the intermediate candidate invitees and meeting the familiarity condition, and the feasible solution is obtained by repeating operation S308.

However, the feasible solution in the operation S310 is not a solution with the minimum total distance from the geographical locations of the intermediate invitees to the rally point location (q) because the expansion of the branch-and-bound tree is conditioned on which candidate invitee is added first. If a candidate invitee close to the rally point location (q) is selected early, the expansion of the branch-and-bound tree might not choose another farther candidate invitee that yields a better solution which also satisfies the familiarity constraint but with a smaller total distance from the geographical locations of the intermediate invitees to the rally point location (q).

As a result, operation S312 is finding a group of (p) selected invitees meeting the familiarity condition and the total distance from the geographical locations of the selected invitees to the rally point location (q) is minimized. Theoretically, all combinations of the second set $(S_I)$ have to be examined to find the optimal group of (p) selected invitees.

However, it is slow to examine each of them one by one. Therefore, the information of distance and familiarity are utilized in determining if a node in the branch-and-bound tree associated with a second set ($S_I$) should be expanded.

When considering distance information, a node in the branch-and-bound tree is abandoned if the following condition holds: $\Sigma_{v \in S_I} d_{v,q} + (p - |S_I|) d_{v_{min},q} \geq D$, where ($\Sigma_{v \in S_I} d_{v,q}$) denotes a total distance of the geographical locations of the intermediate candidate invitees in the second set ($S_I$) to the rally point location (q), ($|S_I|$) is a number of the intermediate candidate invitees in the second set ($S_I$), ($d_{v_{min},q}$) denotes a distance from a candidate invitee closest to the rally point location (q) in the first set ($S_R$), and (D) denotes a minimum total distance of the feasible solutions examined. The distance information is used to prune the branch-and-bound tree to avoid unnecessary search, so the strategy is termed as distance pruning. Distance pruning filters out nodes in the branch-and-bound tree where combinations expanded from the nodes do not yield a result with a lower total distance.

When considering familiarity information, a node in the branch-and-bound tree is abandoned if the following condition holds:

$$\frac{1}{p}\left[\sum_{v \in S_I} |N_v^I| + (p - |S_I|) \max_{v \in S_R} |N_v^R| + 2 \cdot \sum_{v \in S_I} |InterEdge(v)|\right] < (p - k - 1),$$

where ($N_v^I$) is a number of a set of the intermediate invitees in the second set ($S_I$) connected to (v), ($N_v^R$) is a number of a set of the candidate invitees in the first set ($S_R$), and (InterEdge(v)) is a set of edges connecting (v) in the second set ($S_I$) to any candidate invitee in the first set ($S_R$). The familiarity information is used to prune the branch-and-bound tree to avoid unnecessary search, so the strategy is termed as familiarity pruning. It stops processing because the expansion from the node associated with the second set ($S_I$) does not yield results meeting the familiarity constraint.

Figure 8A:
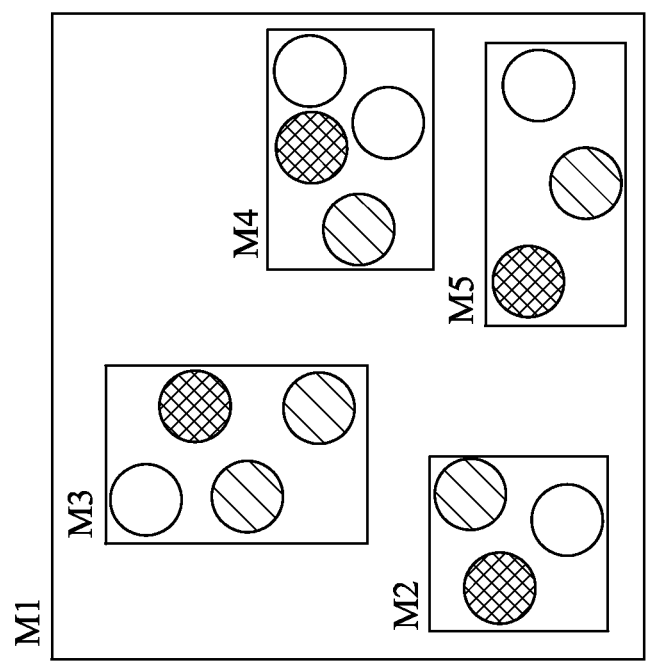
FIG. 8A is a schematic diagram illustrating the connectivity among candidate invitees according to a fourth embodiment of the disclosure.
Figure 8B:
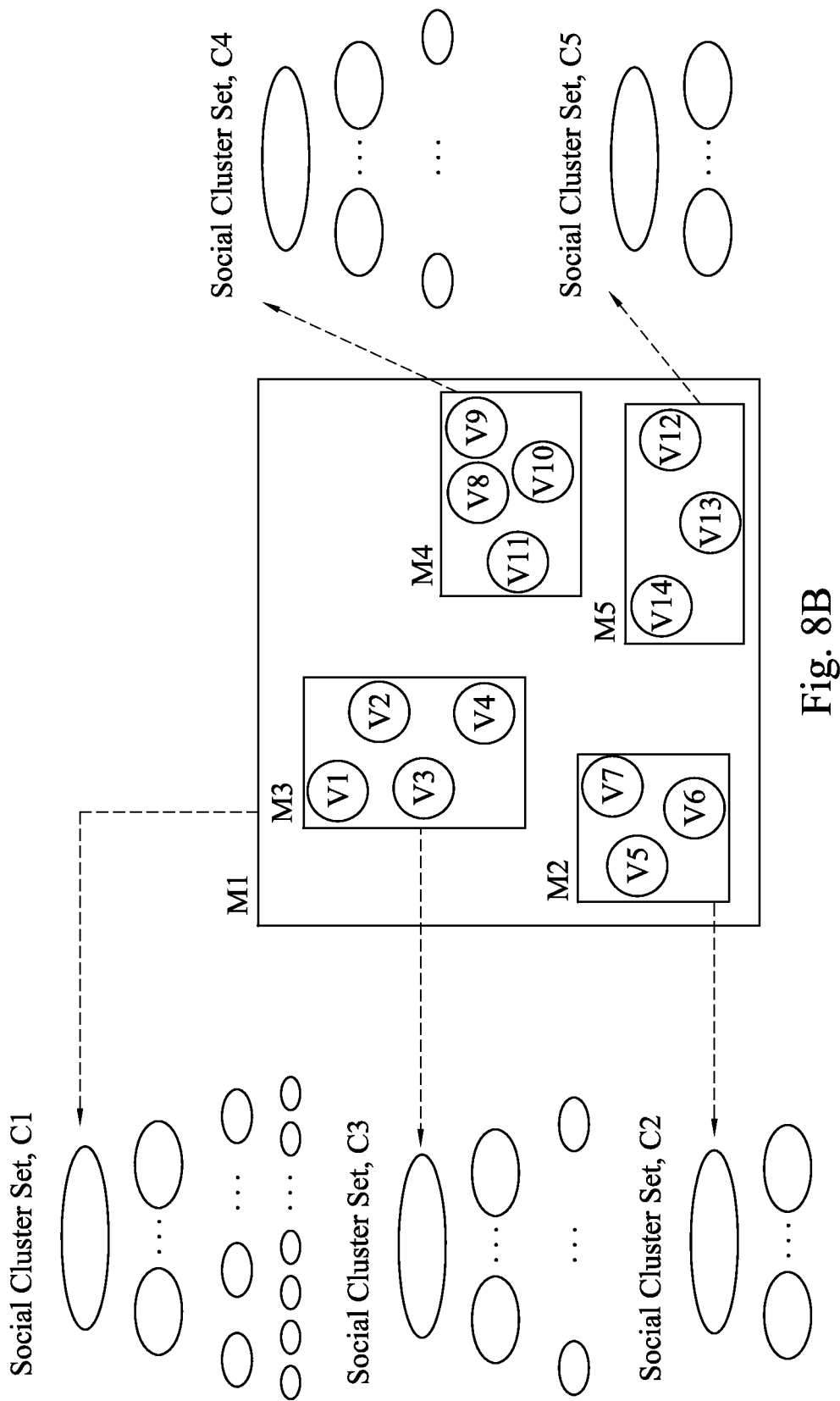
FIG. 8B is a schematic diagram of a SR-tree according to the fourth embodiment of the disclosure.

FIG. 8A is a schematic diagram illustrating the connectivity among candidate invitees according to a fourth embodiment. In FIG. 8A, only the candidate invitees with the same color are acquainted with each other. As shown in the diagram, the candidate invitees in the minimum bounding rectangle M4 are not acquainted with each other, hence adding all the candidate invitees in M4 to the second set ($S_I$) is too aggressive to generate a solution satisfying the familiarity constraint. On the other hand, choosing a group of mutually acquainted candidate invitees is not efficient, especially for a large (k), since more candidate invitees in the same MBR are selected jointly. Therefore, a data structure called social cluster is disclosed herein to identify groups of candidate invitees with different connectivity, and SR-tree incorporates R-tree and the concept of social cluster. FIG. 8B is a schematic diagram of an SR-tree according to the fourth embodiment of the disclosure. In the fourth embodiment, the operation of finding the group of selected invitees is similar to aforementioned operations in the third embodiment. However, the tree data structure used to pack the candidate invitees is an SR-tree data structure. The SR-tree data structure is based on the R-tree data structure, and incorporates and summarizes the social information for the candidate attendees in an MBR. In the SR-Tree data structure, all the candidate attendees in each MBR are indexed into multiple social clusters with different social densities so it is suitable for different familiarity constraint number (k).

The social clusters in the SR-tree in the fourth embodiment are shown in FIG. 8B. Small social clusters in a lower level are iteratively combined to large social cluster in the higher level. At the bottom level (level 0), each cluster is a single candidate invitee. Multiple clusters in current level are combined to generate a new social cluster in one level above.

The social clusters meet cross MBR requirement, social connectivity requirement, and spatial distance requirement. The cross MBR requirement means each cluster must span at least two child MBRs of the current MBR, since a cluster spanning only one child MBR can be generated when considering the child MBR. The social connectivity requirement specifies the minimum social connectivity allowed for each social cluster. The spatial distance requirement ensures that the average distance from a candidate invitee to the geometric median of a social cluster must not exceed a threshold, to avoid the case that the candidate invitees of a social cluster are distributed diversely in a large MBR.

After the SR-tree data structure is built, the candidate invitees are jointly moved in a unit of social cluster to improve the efficiency of the processing. The operation of expanding the branch-and-bound tree is the same as the aforementioned detailed description.

The second type of the social activity request is organizing a social activity related to a hobby or exercise. The candidate invitees decide whether or not to join the social activity by evaluating their interests in the intrinsic properties of the social activity. For example, if a person who appreciates abstract art has complimentary tickets for a modern art exhibition at the MoMA, she would probably want to invite her friends and friends of friends with this shared interest.

Nowadays, many people are accustomed to sharing information with their friends on social networking websites, such as Facebook, Myspace, Meetup, MyYearbook, and LikeALittle. A recent line of studies has introduced effective algorithms to quantify the interests of a person according to the interest attributes in her personal profile and the contextual information of her interaction with friends. Moreover, social connectivity models have been widely studied for evaluating the familiarity between two friends in the aforementioned websites. For the second type of social activities, willingness of selected candidate invitees is maximized with respect to the interest and familiarity information.

Figure 9:
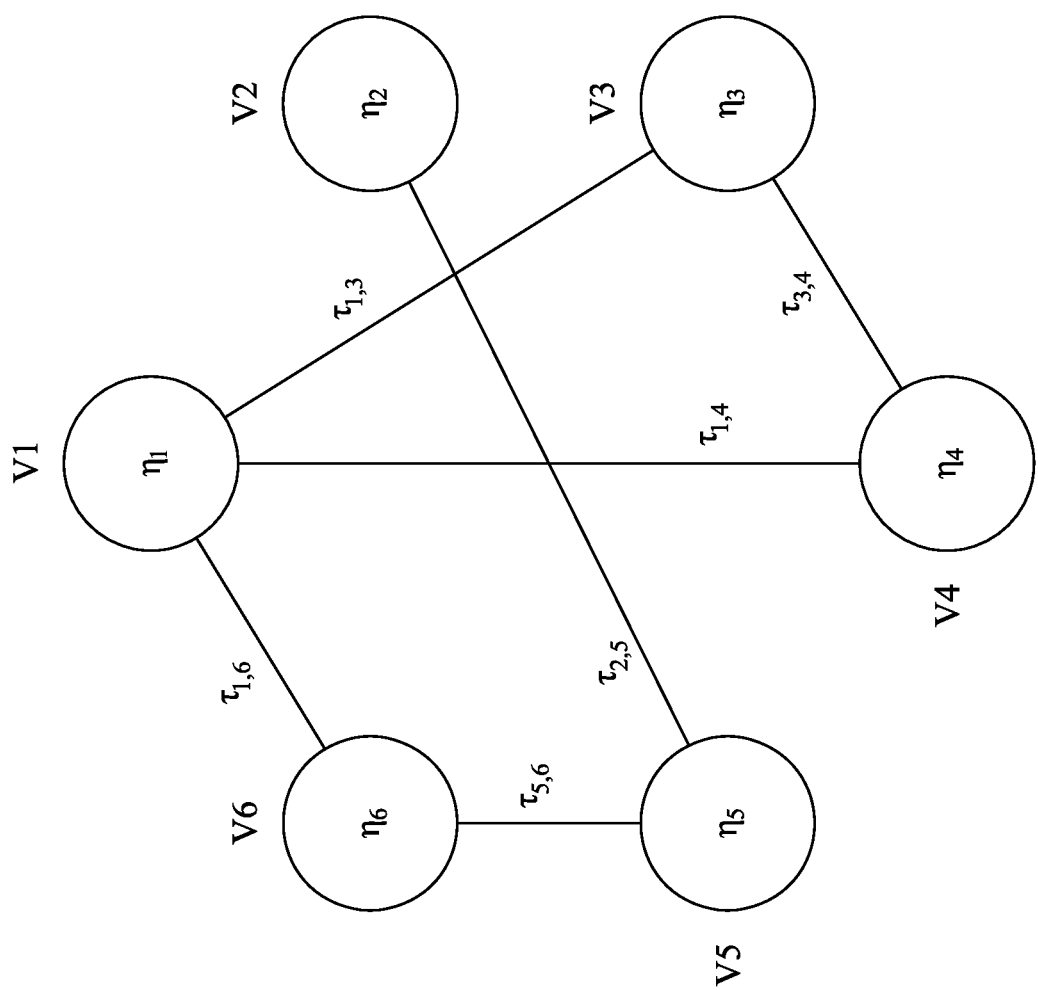
FIG. 9 is a schematic diagram of a social graph according to a fifth embodiment of the social activity planning method of the disclosure.
Figure 10:
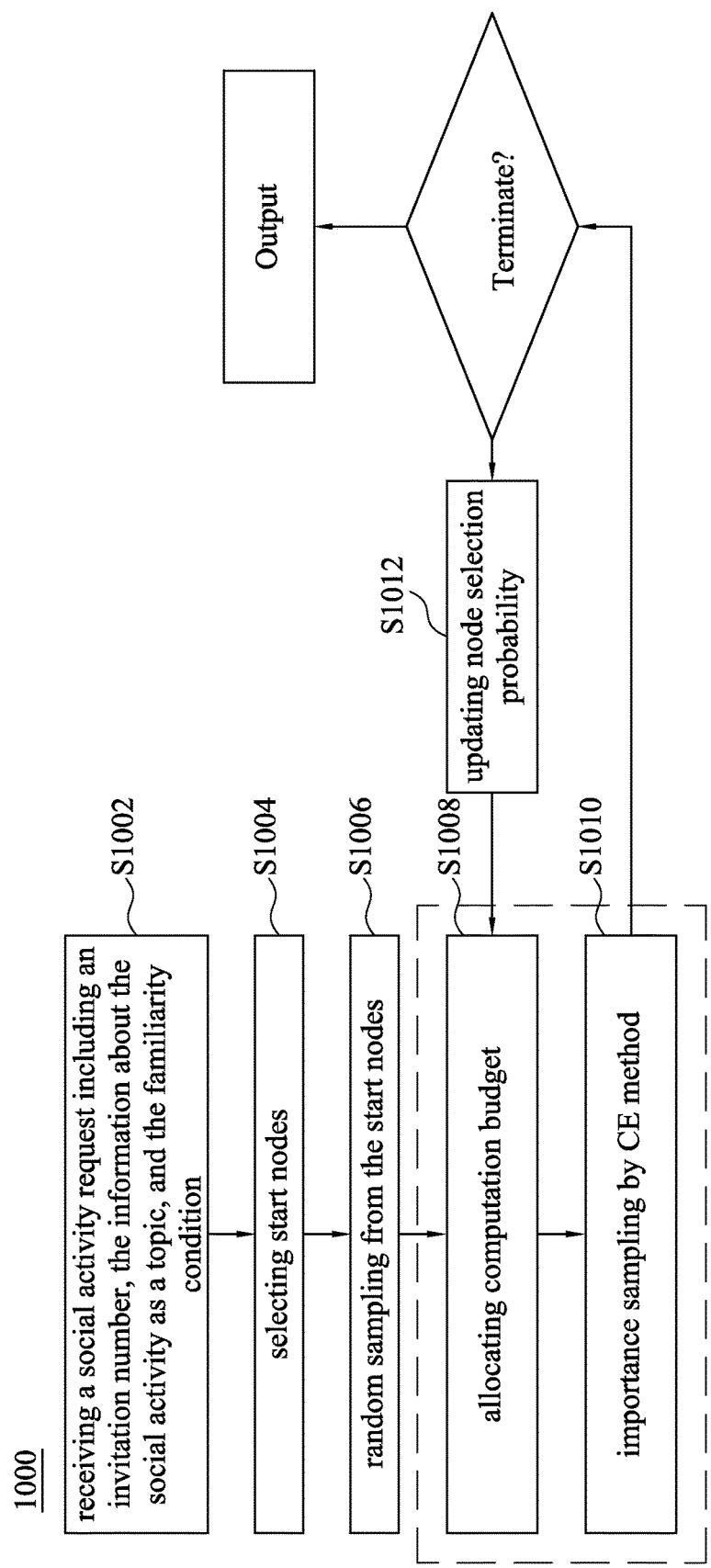
FIG. 10 is a flow chart according to the fifth embodiment of the social activity planning method of the disclosure.

FIG. 9 is a schematic diagram of a social graph according to a fifth embodiment of the social activity planning method of the disclosure. FIG. 10 is a flow chart according to the fifth embodiment of the social activity planning method. As in the operation S202, a database storing a social graph ($G=\{V,E\}$), with vertices ($v_i \in V$) representing the candidate invitees, and edges ($e_{i,j} \in E$) connecting vertex ($v_i$) and vertex ($v_j$) representing mutual acquaintance of the candidate invitees represented by the vertex ($v_i$) and the vertex ($v_j$) is accessed. In the present embodiment, weights ($\tau_{i,j}$) carried by the edges ($e_{i,j} \in E$) representing social tightness between the vertex ($v_i$) and the vertex ($v_j$) are also stored in the database and labeled beside the edges in FIG. 9. Interest scores of the candidate invitees are labeled in the vertices.

The social graph in the present embodiment offers a finer scale of the familiarity between two candidate invitees than just differentiating between connected or unconnected. The weights are indicators of how often the candidate invitees interact with each other on the social networking websites or by the information they provide on the social networking websites.

After accessing the database, operation S1002 is receiving a social activity request with an invitation number (p), information about a social activity, and a familiarity condition. The different of operation S1002 is that the familiarity condition in the present embodiment is to increase a summed social tightness among (p) candidate invitees who are also interested in the topic.

In the present embodiment, the information about the social activity is the topic toward which the interest scores of candidate invitees are stored in the database. It should be apparent to one of ordinary skill in the art that when there are multiple topics with respective interest scores associated with candidate invitees stored in the database, the social activity planning method is scalable to process the request. The description in the present disclosure is simplified for explanation and should not be used to limit the present disclosure hereto.

For the social activity request described in the previous paragraph, it is desirable to find a group of candidate invitees with the maximized willingness incorporating the interest scores and the social tightness. To find the group with the maximal willingness, a brute-force method is calculating the willingness for all combinations of (p) candidate invitees, and choosing the one with the highest willingness. However, it is very time-consuming to run the brute-force method, and the processing time grows exponentially as the number of the candidate invitees grows.

Another obvious solution is greedy algorithm, which starts from the candidate invitee with the highest summation of the interest score and the accumulated social tightness on the edges, and then choosing one of the connected candidate invitees under the same condition. The operation is repeated until (p) candidate invitees are selected. Greedy algorithm is greatly more efficient than the brute-force method, but it leads to a solution trapped in a local maximum.

As a result, the social activity planning method in the fifth embodiment adopts random optimization to efficiently find the solution. Random optimization works by iteratively selecting better start nodes near generated samples in the sample space with an updated node selection probability. The sample space is all combinations of (p) candidate invitees from all candidate invitees, and a sample (F) is one of the combinations. The willingness of a sample (W(F)) is the objective function and measures how good a feasible solution is. (W(F)) is formulated as the following equation:

$$W(F) = \sum_{v_i \in F} \left( \eta_i + \sum_{v_j \in F: e_{i,j} \in E} \tau_{i,j} \right),$$

where ($\eta_i$) is the interest score associated with the candidate invitee.

The algorithm used for random optimization in the present disclosure is termed as CBAS (Computing Budget Allocation for Start nodes), and is inspired by OCBA (Optimal Computing Budget Allocation). CBAS aims for optimally invest more computational budget in candidate invitees with the potential to generate samples with high willingness. Moreover, CBAS is also an approximation algorithm, which generates results approximating to optimal solutions within an approximation ratio, and is particularly useful for limited computational resource. By adopting CBAS, computational resource spent on a task is determined before solving a task, which means better management of resources.

Operation S1004 is selecting a predetermined number (m) of start nodes from the candidate invitees with the highest summation of the interest score and summation of the social tightness on the edges. In operation S1006, one of the neighboring nodes of the start node is selected randomly to build a sample for each start node. The sample is built incrementally by randomly adding a neighboring node to the nodes already in the start sample with (p−1) iterations. The sample with the highest willingness is chosen as the initial feasible solution.

Operation S1008 is allocating computation budget. Computation budget in CBAS is a number of samples generated to find the optimal solution. After the social activity request is received, a total computation budget (T) is determined according to the number of the candidate invitees, the invitation number (p), the approximation ratio (i.e., how close the result is to the optimal solution). The computation budget is increased if the number of the candidate invitees, the invitation number (p), or the approximation ratio is large. The computation budget is decreased if system information indicates little CPU computation resources available.

The allocation of the total computation budget (T) includes allocating the total computation budget into multiple stages, and allocating a number of the samples associated with each of the start nodes according to a maximum value and a minimum value of the willingness of the samples associated with each of the start nodes in the previous stage. If the difference between the maximum value and the minimum value is high, it means more variation is present near the samples associated with the start node. Therefore, more computation budget is allocated to sample near the associated start node.

The neighboring nodes added to the samples are selected according to a node selection probability repeatedly until the samples include (p) candidate invitees, and the node selection probability is written as: $\vec{\alpha}_i = (\alpha_{i,1}, \alpha_{i,2}, \ldots, \alpha_{i,n})$, where ($\alpha_{i,j}$) is the probability of selecting ($v_j$) for the start node ($v_i$).

Samples are generated repeatedly until a total number of samples exceeds the total computation budget (T). In one embodiment, the node selection probability is a uniform distribution, and the process of the social activity planning method 1000 terminates when the total computation budgets (T) is consumed. The sample with the maximum willingness is selected as a group of selected invitees and output to the social activity organizer.

In another embodiment, the node selection probability is determined with cross-entropy method to do importance sampling. Importance sampling has samples generated from a different distribution rather than the distribution of interest, because the distribution of interest is unknown but the distribution used to generate samples is related to the distribution of interests and tells where the important samples are. In the present embodiment, importance sampling uses distribution generated from the results of previous samples to approximate the unknown distribution. By generating more samples around the important samples, it is more likely to find the optimal solution with less computation budget. Operation S1010 and operation S1012 are related to cross-entropy method originated from importance sampling.

In operation S1010, the neighboring nodes added to the samples are selected according to a node selection probability repeatedly until the samples include (p) candidate invitees. In operation S1012, the node selection probability for each start node is updated by calculating the willingness of the samples generated from each start node, ordering the samples according to the their willingness, and making use of the top performance samples. Updating the node selection probability speeds up the approximation speed to the optimal solution, and the computation budget used is reduced as well.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of the disclosure provided they fall within the scope of the following claims.

What is claimed is:

1. A social activity planning system, comprising:
a database storing a plurality of candidate invitees, geographical locations of the candidate invitees, interest scores towards a topic of the candidate invitees, and a social graph (G={V,E}) comprising vertices ($v_i \in V$) representing the candidate invitees, and edges ($e_{i,j} \in E$) connecting vertex ($v_i$) and vertex ($v_j$) representing mutual acquaintance of the candidate invitees represented by the vertex ($v_i$) and the vertex ($v_j$); and
a social activity planning device connected to the database, comprising a processing unit and an input unit, wherein the input unit receives a social activity request comprising an invitation number (P), information about a social activity, and a familiarity condition for the social activity request, and the processing unit finds a feasible solution, wherein the feasible solution comprises (p) candidate invitees and meets the familiarity condition, and
wherein the information about a social activity request comprises a rally point location (q), the familiarity condition comprises a familiarity constraint number (k), and the processing unit finds the feasible solution by performing the following operations:
(a) packing the candidate invitees in an R-tree data structure with tree nodes in the R-tree data structure representing the candidate invitees or minimum bounding rectangles (MBRs) of the candidate invitees if the R-tree data structure has not been constructed;
(b) generating a priority queue according to the tree data structure with the priority queue in ascending order based on the distance of the geographical locations of the candidate invitees to the rally point location (q);
(c) running backtracking algorithm with a branch-and-bound tree to move candidate invitees from a first set ($S_R$) to a second set ($S_I$) according to the priority queue, wherein the first set ($S_R$) comprises all the candidate invitees at initialization, the candidate invitees moved to the second set ($S_I$) are intermediate candidate invitees, and tree nodes in the branch-and-bound tree representing the second set ($S_I$) comprising different intermediate candidate invitees; and
(d) generating the feasible solution wherein the feasible solution is obtained when the backtracking algorithm first expands the branch-and-bound tree to the second set ($S_I$) comprising (p) intermediate candidate invitees, and meeting the familiarity condition, which means an average number of unknown intermediate candidate invitees of the intermediate candidate invitees in the second set ($S_I$) does not exceed the familiarity constraint number (k).

2. The social activity planning system as claimed in claim 1, wherein the processing unit finds a group of selected invitees based on the feasible solution and the information about the social activity.

3. The social activity planning system as claimed in claim 1, wherein the processing unit is configured to perform the following operation in step (c):
moving the candidate invitees from the first set ($S_R$) to the second set ($S_I$) if an intra-familiarity condition is met, wherein an intra-familiarity ($F(S_I \cup \{v\})$) of a candidate invitee (v) in the first set ($S_R$) to the second set ($S_I$) is defined as:

$$F(S_I \cup \{v\}) = \frac{1}{|S_I \cup \{v\}|} \sum_{v \in S_I \cup \{v\}} |N_v|,$$

wherein ($N_v$) is the set of the intermediate invitees in ($S_I \cup \{v\}$) connected to (v); and the intra-familiarity condition is defined as:

$$F(S_I \cup \{v\}) \geq |S_I \cup \{v\}| - \frac{\hat{k}(|S_I \cup \{v\}|)}{p-1} - 1,$$

wherein $\hat{k}$ is a filtering parameter.

4. The social activity planning system as claimed in claim 1, wherein the processing unit is configured to resume backtracking algorithm with the branch-and-bound tree to find a group of (p) selected invitees meeting the familiarity condition specified by the familiarity constraint number (k), and a total distance from the geographical locations of the selected invitees to the rally point location (q) is minimized.

5. The social activity planning system as claimed in claim 4, wherein the processing unit abandons a node associated with the second set ($S_I$) of the branch-and-bound tree if the following condition holds:

$$\Sigma_{v \in S_I} d_{v,q} + (p - |S_I|) d_{v_{min},q} \geq D,$$

wherein a first term in the equation denotes a total distance of the geographical locations of the intermediate candidate invitees in the second set ($S_I$) to the rally point location (q), ($|S_I|$) is a number of the intermediate candidate invitees in the second set ($S_I$), ($d_{v_{min},q}$) in a second term denotes a distance from a candidate invitee closest to the rally point location (q) in the first set ($S_R$), and (D) denotes a minimum total distance of the feasible solutions examined.

6. The social activity planning system as claimed in claim 4, wherein the processing unit abandons a node associated with the second set ($S_I$) of the branch-and-bound tree if the following condition holds:

$$\frac{1}{p}\left[\sum_{v \in S_I}|N_v^I| + (p-|S_I|)\max_{v \in S_R}|N_v^R| + 2 \cdot \sum_{v \in S_I}|InterEdge(v)|\right] < (p-k-1),$$

wherein ($N_v^I$) is a number of a set of the intermediate invitees in the second set ($S_I$) connected to (v), ($N_v^R$) is a number of a set of the candidate invitees in the first set ($S_R$), and (InterEdge(v)) is a set of edges connecting (v) in the second set ($S_I$) to any candidate invitee in the first set ($S_R$).

7. The social activity planning system as claimed in claim 1, wherein the R-tree data structure is also an SR-tree data structure with the tree nodes representing social clusters of the candidate invitees, wherein the social clusters meets following requirements: cross MBR requirement, social connectivity requirement, and spatial distance requirement, and the processing unit moves the candidate invitees jointly as the social clusters.

8. The social activity planning system as claimed in claim 1, and the processing unit is configured to generate the feasible solution by performing the following operations:
  (a) calculating a weighted sum of the interest score toward the topic and a summation of the weights of the connected edges with the familiarity weight ($\lambda$) for each candidate invitee;
  (b) selecting a predetermined number (m) of start nodes from the candidate invitees with the highest summation of the interest score and summation of the social tightness on the edges;
  (c) selecting (p−1) candidate invitees for each of the start node randomly, wherein each group of the (p) candidate invitees is termed as a sample (F); and
  (d) choosing the sample with highest willingness as the feasible solution, wherein the willingness of a sample (W(F)) is formulated as follows:

$$W(F) = \sum_{v_i \in F} \left( \eta_i + \sum_{v_j \in F : e_{i,j} \in E} \tau_{i,j} \right)$$

wherein weights ($T_{i,j}$) carried by the edges ($e_{i,j} \in E$) represent social tightness between the vertex ($v_i$) and the vertex ($v_j$), the information about a social activity request comprises the topic, the familiarity condition is to maximize a summed social tightness among the (p) candidate invitees interested in the topic.

9. The social activity planning system as claimed in claim 8, wherein the processing unit allocates a number of the samples associated with each of the start nodes according to a maximum value and a minimum value of the willingness of the samples associated with each of the start nodes, generates the samples associated with each of the start nodes according to a node selection probability repeatedly until a total number of samples exceeds a total computation budget (T), and selects the sample with the maximum willingness as a group of selected invitees.

10. The social activity planning system as claimed in claim 9, wherein the node selection probability is a uniform distribution.

11. The social activity planning system as claimed in claim 9, wherein the node selection probability is determined with cross-entropy method.

12. A social activity planning method, comprising:
  (a) accessing a database storing a plurality of candidate invitees, geographical locations of the candidate invitees, interest scores towards a topic of the candidate invitees, and a social graph (G={V,E}) comprising vertices ($v_i \in V$) representing the candidate invitees, and edges ($e_{i,j} \in E$) connecting vertex ($v_i$) and vertex ($v_j$) representing mutual acquaintance of the candidate invitees represented by the vertex ($v_i$) and the vertex ($v_j$);
  (b) receiving a social activity request comprising an invitation number (p), information about a social activity, and a familiarity condition for the social activity request; and
  (c) generating a feasible solution, wherein the feasible solution comprises (p) candidate invitees and meets the familiarity condition,
  wherein the information about a social activity request comprises a rally point location (q), the familiarity condition comprises a familiarity constraint number (k), and step(c) comprises the following operations:
  (c-1) packing the candidate invitees in an R-tree data structure with tree nodes in the R-tree data structure representing the candidate invitees or minimum bounding rectangles (MBRs) of the candidate invitees if the R-tree data structure has not been constructed;
  (c-2) generating a priority queue according to the R-tree data structure with the priority queue in ascending order based on the distance of the geographical locations of the candidate invitees to the rally point location (q);
  (c-3) running backtracking algorithm with a branch-and-bound tree to move candidate invitees from a first set ($S_R$) to a second set ($S_I$) according to the priority queue, wherein the first set ($S_R$) comprises all the candidate invitees at initialization, the candidate invitees moved to the second set ($S_I$) are intermediate candidate invitees, and tree nodes in the branch-and-bound tree representing the second set ($S_I$) comprising different intermediate candidate invitees; and
  (c-4) generating the feasible solution wherein the feasible solution is obtained when the backtracking algorithm first expands the branch-and-bound tree to the second set ($S_I$) comprising (p) intermediate candidate invitees, and meeting the familiarity condition, which means an average number of unknown intermediate candidate invitees of the intermediate candidate invitees in the second set ($S_I$) does not exceed the familiarity constraint number (k).

13. The social activity planning method as claimed in claim 12, further comprising:
  finding a group of selected invitees based on the feasible solution and the information about the social activity.

14. The social activity planning method as claimed in claim 12, step (c-3) further comprising:
  moving the candidate invitees from the first set ($S_R$) to the second set ($S_I$) if an intra-familiarity condition is met, wherein an intra-familiarity ($F(S_I \cup \{v\})$) of a candidate invitee (v) in the first set ($S_R$) to the second set ($S_I$) is defined as:

$$F(S_I \cup \{v\}) = \frac{1}{|S_I \cup \{v\}|} \sum_{v \in S_I \cup \{v\}} |N_v|,$$

wherein ($N_v$) is the set of the intermediate invitees in ($S_I \cup \{v\}$) connected to (v); and the intra-familiarity condition is defined as:

$$F(S_I \cup \{v\}) \geq |S_I \cup \{v\}| - \frac{\hat{k}(|S_I \cup \{v\}|)}{p-1} - 1,$$

wherein $\hat{k}$ is a filtering parameter.

15. The social activity planning method as claimed in claim 12, further comprising:
  resuming backtracking algorithm with the branch-and-bound tree to find a group of (p) selected invitees meeting the familiarity condition specified by the familiarity constraint number (k), and a total distance from the geographical locations of the selected invitees to the rally point location (q) is minimized.

16. The social activity planning method as claimed in claim 15, further comprising:

abandoning a node associated with the second set ($S_I$) of the branch-and-bound tree if the following condition holds:

$$\Sigma_{v \in S_I} d_{v,q} = (p - |S_I|) d_{v_{min},q} \geq D,$$

wherein a first term in the equation denotes a total distance of the geographical locations of the intermediate candidate invitees in the second set ($S_I$) to the rally point location (q), ($|S_I|$) is a number of the intermediate candidate invitees in the second set ($S_I$), ($d_{v_{min},q}$) in a second term denotes a distance from a candidate invitee closest to the rally point location (q) in the first set ($S_R$), and (D) denotes a minimum total distance of the feasible solutions examined.

17. The social activity planning method as claimed in claim 15, further comprising:

abandoning a node associated with the second set ($S_I$) of the branch-and-bound tree if the following condition holds:

$$\frac{1}{p}\left[\sum_{v \in S_I} |N_v^I| + (p - |S_I|) \max_{v \in S_R} |N_v^R| + 2 \cdot \sum_{v \in S_I} |InterEdge(v)|\right] < (p - k - 1),$$

wherein ($N_v^I$) is a number of a set of the intermediate invitees in the second set ($S_I$) connected to (v), ($N_v^R$) is a number of a set of the candidate invitees in the first set ($S_R$), and (InterEdge(v)) is a set of edges connecting (v) in the second set ($S_I$) to any candidate invitee in the first set ($S_R$).

18. The social activity planning method as claimed in claim 12, wherein in step (c-1), the R-tree data structure is also an SR-tree data structure with the tree nodes representing social clusters of the candidate invitees, wherein the social clusters meets following requirements: cross MBR requirement, social connectivity requirement, and spatial distance requirement, and in step (c-3), the candidate invitees are jointly moved as the social clusters.

19. The social activity planning method as claimed in claim 12, wherein weights ($\tau_{i,j}$) carried by the edges ($e_{i,j} \in E$) represent social tightness between the vertex ($v_i$) and the vertex ($v_j$) the information about a social activity request comprises the topic, the familiarity condition is to increase a summed social tightness among the (p) candidate invitees interested in the topic, and step (c) comprises:

calculating a weighted sum of the interest score toward the topic and a summation of the weights of the connected edges with the familiarity weight ($\lambda$) for each candidate invitee;

selecting a predetermined number (m) of start nodes from the candidate invitees with the highest summation of the interest score and summation of the social tightness on the edges;

selecting (p−1) candidate invitees for each of the start node randomly, wherein each group of the (p) candidate invitees is termed as a sample (F); and choosing the sample with highest willingness as the feasible solution, wherein the willingness of a sample (W(F)) is formulated as follows:

$$W(F) = \sum_{v_i \in F}\left(\eta_i + \sum_{v_j \in F: e_{i,j} \in E} \tau_{i,j}\right).$$

20. The social activity planning method as claimed in claim 19, further comprising:

(d) allocating a number of the samples associated with each of the start nodes according to a maximum value and a minimum value of the willingness of the samples associated with each of the start nodes, generating the samples associated with each of the start nodes according to a node selection probability repeatedly until a total number of samples exceeds a total computation budget (T); and (e) selecting the sample with the maximum willingness as a group of selected invitees.

21. The social activity planning method as claimed in claim 20, wherein the node selection probability is a uniform distribution.

22. The social activity planning method as claimed in claim 20, wherein the node selection probability is determined with cross-entropy method.

* * * * *